Jan. 16, 1940.                    A. KATZOW                    2,187,497
                                  REFRIGERATOR
                                Filed June 1, 1937
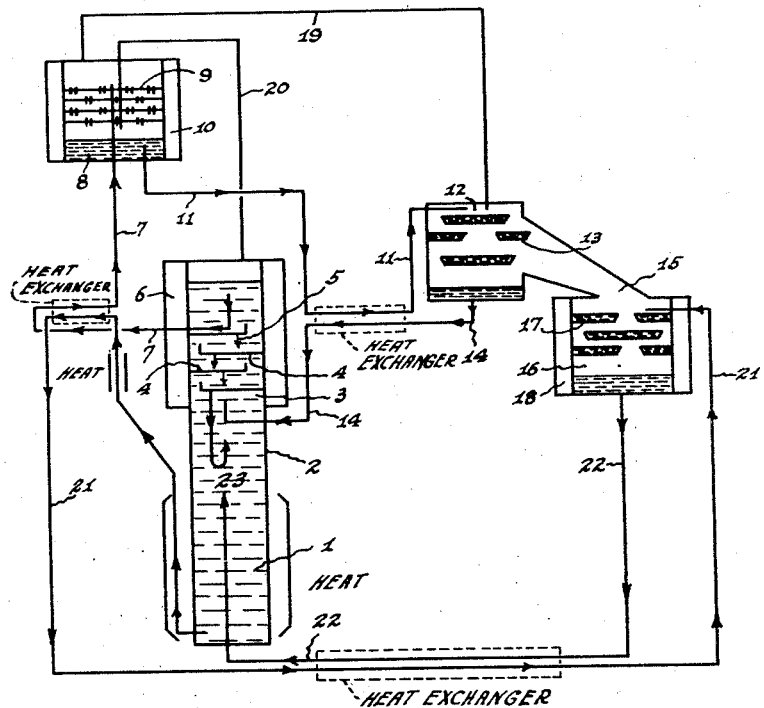
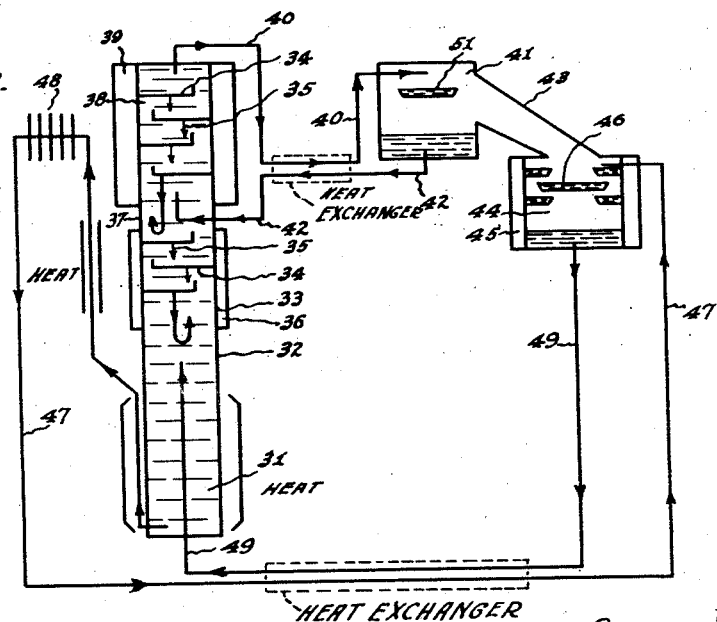
INVENTOR.
Abraham Katzow Patented Jan. 16, 1940

2,187,497

UNITED STATES PATENT OFFICE 2,187,497

REFRIGERATOR

Abraham Katzow, Indianapolis, Ind.

Application June 1, 1937, Serial No. 145,813

18 Claims. (Cl. 62—119.5)

This application relates to a method and apparatus for producing refrigeration, and is a continuation in part of my copending applications Serial Number 111,431 filed November 18, 1936, and Serial Number 135,541 filed April 7, 1937.

Refrigerators of absorption type are known in which the difference of vapor pressure between the evaporator and the absorber on the one hand, and between the generator and the reabsorber on the other hand is more or less equalized by the admixture of a neutral gas.

In refrigerators of this kind the connection between the generator and the reabsorber is vapor filled as is also the connection between the evaporator and the absorber. Should either of the gas filled spaces undergo a change in pressure, such as would result from change in evaporator temperature or a change in the temperature of the fluid used to cool the reabsorber, pressures throughout the system would be temporarily unbalanced, thus impairing the efficiency, and may stop the operation of the system. For example, if the reabsorber cooling fluid were to undergo an increase in temperature a pressure differential would be created tending to cause—and, in practice not infrequently effecting—the displacement of the reabsorbed refrigerant from the reabsorber back into the generator. Not only the reabsorbed refrigerant but also some of the mixture of gases normally in the evaporator might be displaced into the generator.

Refrigerators in which the total pressure of gases in the evaporator is more or less equalized by means of vapor in the generator, are dependent on the cooling medium which cools the condenser to such a degree that in the event the cooling medium should get warmer, a rise of pressure in the generator and in the evaporator will have to take place (otherwise no condensation of vapor in the condenser will take place), or with a fall in temperature of the cooling medium a fall in pressure in the generator and in the evaporator will have to take place. To overcome this the pressure in the generator and in the evaporator is fixed sufficiently high so that the operation of the system is insured at a high temperature of the cooling medium. Of course, this means that the evaporation temperature (in the evaporator) is fixed and cannot be regulated at will.

The purpose of the present invention is to provide a practical and efficient refrigerator of absorption type without the undesirable features encountered with in the above mentioned systems, and according to this invention the problem is solved by having a body in a liquid form containing a volatile and a relatively nonvolatile substance, and from a portion of which the volatile substance is continuously evaporated while it extracts heat from the surroundings, and into a portion of which the evaporated substance is continuously absorbed while the volatile substance gives up heat to a cooling medium.

Further objects features and advantages of the invention will be evident as the description proceeds with reference to the accompanying drawing in which Fig. 1 shows one form of my invention; and Fig. 2 shows a modified form of the invention.

Referring to Fig. 1 reference character 1 designates a generator, which may be heated in any suitable manner. 2 designates a pipe which connects the generator 1 to a reabsorber 3 and which provides an open communication between the two. In order to increase the reabsorption effect of refrigerant which enters the reabsorber, and in order to condense out absorption liquid which may be carried over from the generator, there are inserted a series of baffling plates 4. Each of these baffling plates 4 has a tube 5 in order to facilitate the flow of carried over absorption liquid back to the generator 1. A series of fins 6 are attached to the reabsorber 3, by means of which the reabsorber is cooled. It should be distinctly understood, however, that other means for cooling the reabsorber may be used. The upper part of the reabsorber 3 is connected to a chamber 8 by means of a conduit 7. Perforated plates 9 are arranged within the chamber 8. A series of fins 10 which extend into the atmospheric air are attached to the chamber 8, by means of which the chamber is cooled. Other means for cooling the chamber 8 may be used. The lower part of the chamber 8 is connected to an evaporator 12 by means of a conduit 11. Baffling plates 13 are arranged within the evaporator to provide a large surface for liquid. The evaporator 12 is connected to the reabsorber 3 by means of a conduit 14. Conduits 11 and 14 are arranged to form a temperature exchanger with each other. The evaporator 12 is connected to an absorber 16 by means of a pipe 15 which provides an open communication between the two. Baffling plates 17 are arranged within the absorber 16 for the purpose of distributing absorption liquid over a large surface. Fins 18 are attached to the absorber 16 by means of which the absorber is cooled. Obviously, other means for cooling the absorber may be used. The lower part of the generator is connected to the upper part of the absorber 16 by means of a conduit 21. A portion of the conduit 7 and a portion of the conduit 21 which is arranged at a level higher than that of the absorber 16 are arranged to form a temperature exchanger with each other. The lower part of the absorber 16 is connected to the generator by means of a conduit 22. Parts of conduits 21 and 22 are arranged to form a temperature exchanger with each other. To equalize pressures in the upper part of the reabsorber 3, chamber 8 and evaporator 12 conduit 19 connects the vapor space of the chamber 8 with the vapor space of the evaporator 12, and conduit 20 connects the vapor space of the reabsorber 3 with the vapor space of the chamber 8.

Numerous substances may be used in practice of my invention, but at present I consider the use of ammonia as a refrigerant, water as an absorbent and hydrogen as a neutral gas. The liquid is designated as 23.

The operation of the invention is as follows:

The generator 1 is heated by any suitable means. Ammonia vapor is expelled from the solution 23 and passes through the liquid in the pipe 2 into the reabsorber 3. In the reabsorber ammonia concentrates the solution while giving up heat to the atmospheric air, by means of fins 6. Absorption liquid which contains little ammonia solution passes from the generator 1 into the conduit 21 where it is further heated. This heating causes formation of vapor in the conduit 21 which lifts the liquid to a higher level from where the liquid gravitates into the upper part of the absorber 16. Vapor formed in the conduit 21 enters the highest portion of the conduit 21 where it is condensed by giving up its heat to the solution in the conduit 7. This heating causes formation of vapor in the conduit 7 which lifts the liquid from the reabsorber 3 into the chamber 8. In the chamber 8 the solution gives up its heat while flowing over the plates 9 to the atmospheric air, by means of fins 10. From the chamber 8 the solution gravitates through the conduit 11 into the upper part of the evaporator 12 where due to lower pressure of ammonia vapor the solution while flowing over the baffling plates 13 gives up ammonia. In leaving the solution ammonia extracts heat from the surroundings, thus producing refrigeration. From the evaporator 12 the ammonia vapor passes by diffusion into the absorber 16 where it is absorbed by the weak absorption liquid. Since the flow of ammonia vapor is in one direction only, no movement of hydrogen takes place. Heat produced in absorption is carried away by means of atmospheric air which comes into contact with the radiation fins 18. From the evaporator 12 the solution which gave up some of its ammonia gravitates through the conduit 14 into the reabsorber 3 where it absorbs ammonia from the generator 1. From the absorber 16 the enriched solution returns to the generator 1 through the conduit 22 to repeat the cycle.

If heat is supplied to the generator at a rate sufficient to cause ebullition of the refrigerant then the refrigerant will pass from the generator in the form of bubbles. However, refrigeration will be produced in this system in absence of ebullition; for the temperature differential existing between the generator and the reabsorber, even if the generator temperature is insufficient to cause bubbles of ammonia to form, will result in transference of ammonia by diffusion from relatively higher pressure of ammonia in the generator to a relatively lower pressure of ammonia in the reabsorber. If, for example, the total pressure of ammonia and hydrogen (in the evaporator) is 170 pounds per sq. inch while the pressure of ammonia in the reabsorber is 120 pounds per sq. inch, raising the pressure of ammonia in the generator above that in the reabsorber (say to 140 pounds per sq. inch) will cause diffusion of ammonia from the generator into the reabsorber where it will concentrate the solution.

In the apparatus shown in Fig. 2, reference character 31 designates a generator which is heated in any suitable manner. 32 a pipe which connects the generator to a rectifier 33 and which provides an open communication between the two. In order to decrease the speed of refrigerant which passes from the generator 31 into the rectifier 33 and in order to condense out the absorption liquid from the refrigerant, there are inserted within the rectifier 33 a series of baffling plates 34. Each of these plates has a tube 35 to facilitate the flow of absorption liquid back to the generator. Heat radiation fins 36 are attached to the rectifier 33 by means of which the rectifier is cooled. Other means for cooling the rectifier may be used. The upper part of the rectifier 33 is connected to the lower part of a reabsorber 38 by means of a pipe 37 which provides an open communication between the two. In order to increase the absorption effect of refrigerant which enters the reabsorber, and in order to condense out absorption liquid which may be carried over from the rectifier into the reabsorber, there are inserted a series of baffling plates 34. Each of these baffling plates has a tube 35 to facilitate the flow of absorption liquid back to the generator 1. Heat radiation fins 39 are attached to the reabsorber 38 by means of which the reabsorber 38 is cooled. Other means for cooling the reabsorber may be used. The upper part of the reabsorber 38 is connected to an evaporator 41 by means of a conduit 40 through which a solution of refrigerant and absorption liquid passes into the evaporator. The lower part of the reabsorber 38 is connected to the evaporator 41 by means of a conduit 42 through which a solution weakened in the evaporator passes into the reabsorber 38. Baffling plates 51 are arranged within the evaporator 41. Conduits 40 and 42 are arranged to form a temperature exchanger with each other. Pipe 43 connects the vapor space of the evaporator 41 with the vapor space of an absorber 44. Baffling plates 46 are arranged within the absorber 44 for the purpose of distributing absorption liquid over a large surface. Heat radiation fins 45 are attached to the absorber 44 by means of which the absorber 44 is cooled. Other means for cooling the absorber may be used. The lower part of the generator 31 is connected to the upper part of the absorber 44 by means of a conduit 47. A portion of the conduit 47 is arranged at a higher level than the absorber 44. Heat radiation fins 48 are attached to the highest portion of the conduit 47, by means of which the portion of conduit 47 is cooled. Other means for cooling may be used. The lower part of the absorber 44 is connected to the generator 31 by means of a conduit 49. A part of conduit 47 and a part of conduit 49 are arranged to form a temperature exchanger with each other.

The operation is as follows:

Heat is applied to the generator 31 whereby ammonia is expelled from the solution 50 and passes through the liquid in the pipe 32 into the rectifier 33. To condense absorption liquid from ammonia carried over, plates 34 are inserted within the rectifier 33. That this condensation of absorption liquid can be accomplished without any difficulty is evident from the fact that the absorption liquid will condense at a higher temperature than the vapor of refrigerant, therefore the rectifier should be of higher temperature than the reabsorber. Absorption liquid condensed out in the rectifier 33 gravitates back to the generator 31 through the tubes 35, while ammonia passes upward in form of bubbles or by diffusion through the liquid in the pipe 37 into the reabsorber 38 where the ammonia enriches the solution in the reabsorber while giving up its heat to the atmospheric air by means of fins 39. The solution in the reabsorber contains more ammonia than the solution in the evaporator or the absorber, therefore the column in the reabsorber is the highest. A flow of liquid from the reabsorber into the evaporator 41 through the conduit 40 and a flow of heavier liquid from the evaporator 41 into the reabsorber 38 through the conduit 42 takes place due to gravity. In the evaporator ammonia evaporates from the solution while flowing over plate 51 and diffuses through the hydrogen into presence of absorption liquid in the absorber 44, while the weakened solution from the evaporator 41 gravitates through the conduit 42 into the reabsorber 38. Since the flow of ammonia vapor is in one direction only, no movement of hydrogen from the absorber into the evaporator will take place. Absorption liquid which contains little ammonia in solution passes from the generator 31 into the conduit 47 where it is further heated. This heating causes formation of vapor in the conduit 47 which lifts the liquid to a higher level from where the liquid gravitates into the upper part of the absorber 44 where while flowing over the baffling plates 46 it absorbs the ammonia vapor, which enters the absorber 44 through the pipe 43 from the evaporator 41. In absorption ammonia gives up heat which is carried away by means of air.
Vapor formed in the conduit 47 enters the upper portion of the conduit where it is condensed by giving up heat to the atmospheric air, by means of fins 48. From the absorber 44 the enriched solution returns through the conduit 49 to the generator 31 to repeat the cycle.

The invention must not be considered as limited to the above described embodiments, as many variations may be made within the spirit and scope of the invention.

Having thus described my invention, what I claim is:

1. A reabsorption process of refrigerating, which includes maintaining a body of a solution containing a volatile substance and absorption liquid, applying heat to a chamber containing a portion of said body, cooling a second chamber openly connected to the first chamber and containing another portion of said body whereby the concentration of volatile substance in the second chamber is raised above that in the first chamber, leading the concentrated solution in undiluted state from the second chamber into a third chamber and evaporating from the solution in the third chamber the volatile substance, returning the weakened solution from the third into the second chamber and again enriching the weakened solution with volatile substance, forcing the evaporated substance through a neutral gas from the third into a fourth chamber, separating absorption liquid from said body in the first chamber and bringing it into presence of evaporated substance in the fourth chamber, absorbing the evaporated substance into the absorption liquid in the fourth chamber, and returning the absorption liquid containing absorbed volatile substance from the fourth into the first chamber, the concentration of volatile substance in the liquid leaving said third chamber being greater than that in the liquid leaving said fourth chamber.

2. A reabsorption refrigerator apparatus, including a generator, a rectifier, a reabsorber, an evaporator, an absorber and a body in a liquid form containing a volatile substance dissolved in absorption liquid, said generator containing a portion of said body and adapted to expel the volatile substance from the absorption liquid, a pipe containing a portion of said body and adapted for conducting the expelled substance from the generator to the rectifier, said rectifier containing a portion of said body and adapted for condensing and returning the absorption liquid which may enter the rectifier from the generator, means for cooling the rectifier, a pipe containing a portion of said body and adapted for conducting the volatile substance from the rectifier to the reabsorber, said reabsorber containing a portion of said body and adapted for absorption of volatile substance expelled in the generator into said portion, means for cooling the reabsorber, a conduit containing a portion of said body and adapted for conducting the strong solution from the reabsorber into the evaporator, a conduit containing a portion of said body and adapted for conducting weakened solution from the evaporator back to the reabsorber, a pipe connecting the evaporator with the absorber, a neutral gas within said evaporator pipe and absorber, members arranged within the absorber for distributing absorption liquid over a large surface, means for cooling the absorber, a conduit connecting the lower part of the generator with the upper part of the absorber and containing a portion of said body and a conduit connecting the bottom of the absorber with the generator, the concentration of the volatile substance in the liquid leaving the evaporator being greater than that in the liquid leaving the absorber.

3. A reabsorption refrigerator apparatus, including a generator, a reabsorber, an evaporator, an absorber and a body in a liquid form containing a volatile substance and absorption liquid, said generator containing a portion of said body and adapted to expel the volatile substance from the absorption liquid, a pipe containing a portion of said body and adapted for conducting the expelled substance from the generator to the reabsorber, said reabsorber containing a portion of said body and adapted for absorption of volatile substance expelled in the generator into said portion, means for cooling the reabsorber, a conduit for conducting the strong liquid from the reabsorber into a container which is arranged at a higher level than the evaporator, means for heating the last mentioned conduit to lift liquid from the reabsorber to the container, a conduit for conducting the strong liquid from the container to the evaporator by gravity, a conduit containing a portion of said body and adapted for conducting weakened liquid from the evaporator to the reabsorber, means for cooling the container, a vent conduit connecting the upper part of the reabsorber to the upper part of the container, a vent conduit connecting the upper part of the container to the upper part of the evaporator, a pipe connecting the evaporator to the absorber, a neutral gas within said evaporator pipe and absorber, members within the absorber for distribution of absorption liquid over a large surface, means for cooling the absorber, a conduit connecting the lower part of the generator to the upper part of the absorber and containing a portion of said body, and a conduit connecting the bottom of the absorber with the generator, the concentration of the volatile substance in the liquid leaving the evaporator being greater than that in the liquid leaving the absorber.

4. Refrigerating apparatus comprising a body in a liquid form containing a volatile substance dissolved in absorption liquid, a generator containing a portion of said body and adapted to expel volatile substance from the solution, a reabsorber arranged at a higher level than the generator and containing a portion of said body, a pipe connecting the generator to the reabsorber and containing a portion of said body, an evaporator, a container arranged at a higher level than the evaporator, means of expelling the volatile substance from the solution in the generator passing the volatile substance through the liquid in the pipe into the reabsorber and concentrating the volatile substance in the reabsorber, a conduit for conducting the strong solution from the reabsorber to the container, means of heating the conduit to lift liquid from the reabsorber to the container, a conduit for conducting the strong solution by gavity from the container to the evaporator, evaporating the volatile substance from the solution in the evaporator thus producing refrigeration, a conduit for conducting the weakened solution from the evaporator to the reabsorber in heat exchange relation with the strong solution passing to the evaporator, an absorber, a pipe connecting the evaporator to the absorber and which provides an open communication between the two, diffusing the evaporated substance through a neutral gas from the evaporator into presence of absorption liquid in the absorber, a conduit for conducting absorption liquid from the generator to the absorber, means of heating the last mentioned conduit to lift the liquid to a higher level and means of condensing the vapor generated in the conduit, absorbing the evaporated substance into the absorption liquid in the absorber, a conduit for conducting the absorption liquid with absorbed volatile substance from the absorber to the generator in heat exchange relation with absorption liquid passing to the absorber, a vent conduit connecting the upper part of the reabsorber with the upper part of the container, a vent conduit connecting the upper part of the container to the upper part of the evaporator, and means of cooling the reabsorber, the container and the absorber.

5. Refrigerating apparatus comprising a body in a liquid form containing a volatile substance dissolved in absorption liquid, a generator containing a portion of said body and adapted to expel volatile substance from the solution, a rectifier arranged at a higher level than the generator and containing a portion of said body, a pipe connecting the upper part of the generator to the lower part of the rectifier and containing a portion of said body, said rectifier containing a plurality of metal plates having tubes in the same for the return of absorption liquid to the generator, means of cooling the rectifier, a reabsorber arranged at a higher level than the rectifier and containing a portion of said body, a pipe connecting the upper part of the rectifier to the lower part of the reabsorber and containing a portion of said body, said reabsorber containing a plurality of metal plates having tubes in same, means of cooling the reabsorber, means of expelling the volatile substance from solution in the generator and concentrating the solution in the reabsorber with said expelled volatile substance, a conduit connecting the upper part of the reabsorber with the evaporator and adapted for conducting the strong solution from the reabsorber to the evaporator, metal members within the evaporator, evaporating the volatile substance from the solution in the evaporator thus producing refrigeration, a conduit for conducting weakened solution from the evaporator to the reabsorber in heat exchange relation with the strong solution passing to the evaporator, an absorber, metal members within the absorber and means of cooling the absorber, a pipe connecting the evaporator to the absorber and which provides an open communication between the two, a neutral gas within the evaporator absorber and the last mentioned pipe, diffusing the evaporated substance through the neutral gas from the evaporator into presence of absorption liquid in the absorber, a conduit for conducting absorption liquid from the generator to the absorber, means of heating the last mentioned conduit to lift the absorption liquid to a higher level and means of condensing the vapor generated due to heating in the conduit, absorbing the evaporated substance into the absorption liquid in the absorber and a conduit for conducting the absorption liquid with the absorbed volatile substance from the absorber to the generator in heat exchange relation with the absorption liquid passing to the absorber.

6. In a reabsorption method of refrigerating, the steps of heating one portion and cooling another portion of a body of a solution of a volatile refrigerant in a relatively nonvolatile solvent to maintain a higher concentration of the refrigerant in the cooled portion of said body than in the other portion, separating from the body part of the cooled portion thereof, evaporating refrigerant from such separated part, and then returning such part to the cooled portion of said body without intermingling it with the heated portion of said body.

7. In a continuous method of refrigerating, the steps of heating one portion and cooling another portion of a body of a solution of a volatile refrigerant in a relatively non-volatile solvent to maintain a higher concentration of the refrigerant in the cooled portion of said body than in the other portion, simultaneously withdrawing parts of the liquid from the heated and cooled portions of said body respectively, circulating the liquid-parts over independent paths and returning each to that portion of said body from which it was withdrawn, and, in the course of such circulation, evaporating refrigerant from the liquid-part withdrawn from the cooled portion of said body, and absorbing the evaporated refrigerant into the liquid-part withdrawn from the heated portion of said body, the concentration of refrigerant in the liquid-part returned to the heated portion of said body being less than the concentration of refrigerant in the liquid-part returned to the cooled portion of said body.

8. The invention set forth in claim 6 with the addition that the step of evaporating is conducted in the presence of a neutral gas.

9. The invention set forth in claim 7 with the addition that the step of evaporating is conducted in the presence of a neutral gas.

10. In a method of refrigerating, the steps of heating one portion and cooling another portion of a body of a solution of a volatile refrigerant in a relatively nonvolatile solvent to maintain a higher concentration of the refrigerant in the cooled portion of said body than in the other portion while still leaving a substantial proportion of solvent in the cooled portion, evaporating refrigerant from the cooled portion of said body to produce refrigeration, and absorbing such evaporated refrigerant into liquid from the heated portion of said body.

11. In refrigerating apparatus, a vertically extending vessel, an evaporator, a conduit for conveying liquid from a point near the upper end of said vessel to said evaporator, a second conduit for conveying liquid from said evaporator to a point in said vessel below its point of connection to said first conduit, means for cooling that portion of said vessel between said two conduits and below said second conduit, means for heating the lower portion of said vessel, and means for collecting refrigerant evaporated in said evaporator and returning it to the lower portion of said vessel.

12. In refrigerating apparatus, a vertically extending vessel, an evaporator, a conduit for conveying liquid from a point near the upper end of said vessel to said evaporator, a second conduit for conveying liquid from said evaporator to a point in said vessel below its point of connection to said first conduit, means for cooling substantially the entire portion of said vessel lying between said two conduits, means for heating the lower portion of said vessel, and means for collecting refrigerant evaporated in said evaporator and returning it to the lower portion of said vessel.

13. In refrigerating apparatus, a vertically extending vessel, an evaporator, a conduit for conveying liquid from a point near the upper end of said vessel to said evaporator, a second conduit for conveying liquid from said evaporator to a point in said vessel below its point of connection to said first conduit, means for cooling that portion of said vessel between said two conduits and below said second conduit, means for heating the lower portion of said vessel, an absorber, a conduit for conveying gas from said evaporator to said absorber, and conduits for circulating through said absorber liquid from the lower portion of said vessel, the concentration of refrigerant in the liquid returned to the lower portion of said vessel from said absorber being less than the concentration of refrigerant returned to said vessel from said evaporator.

14. In refrigerating apparatus, a vertically extending vessel, an evaporator, a conduit for conveying liquid from a point near the upper end of said vessel to said evaporator, a second conduit for conveying liquid from said evaporator to a point in said vessel below its point of connection to said first conduit, means for cooling that portion of said vessel between said two conduits, means for heating the lower portion of said vessel, an absorber, a conduit for conveying gas from said evaporator to said absorber, and conduits for circulating through said absorber liquid from the lower portion of said vessel, the concentration of refrigerant in the liquid returned to the lower portion of said vessel from said absorber being less than the concentration of refrigerant returned to said vessel from said evaporator.

15. In refrigeration apparatus, a generator, a re-absorber, an evaporator, an absorber, liquid-conveying conduits interconnecting the evaporator and re-absorber, a gas-conveying conduit interconnecting the evaporator and the absorber, a liquid-conveying conduit for conveying liquid from the generator to the absorber, and a liquid-conveying return conduit interconnecting the generator and the bottom of the absorber, said generator, re-absorber, evaporator, absorber, and last mentioned conduit containing respectively portions of a continuous body of a solution of a volatile refrigerant in a relatively non-volatile solvent and being so arranged that the weight of solution in said return conduit and in said absorber balances the weight of solution in the generator and re-absorber.

16. In refrigeration apparatus, a generator, a rectifier, a re-absorber, an evaporator, liquid-conveying conduits interconnecting the re-absorber and the evaporator, an absorber for absorbing refrigerant evaporated in said evaporator, a conduit for conveying liquid from the generator to the absorber and a return conduit connecting the lower portion of the absorber with the generator, said generator, rectifier, re-absorber, evaporator, absorber and last mentioned conduit containing portions of a continuous body of a solution of a volatile refrigerant in a relatively non-volatile solvent and being so arranged that the weight of solution in said return conduit and in said absorber balances the weight of solution in said generator, rectifier, and re-absorber.

17. A continuous process of producing refrigeration, which comprises maintaining a body of a solution containing a volatile solvent dissolved in absorption liquid, reducing the concentration of volatile substance in one portion of said body and increasing the concentration in another portion of said body while still leaving a substantial proportion of absorption liquid in such latter portion, evaporating the volatile substance from the undiluted concentrated portion of the solution, and absorbing such evaporated substance in the weakened portion of said solution.

18. A continuous process of refrigeration, which comprises maintaining a body of a solution containing a volatile substance dissolved in absorption liquid, reducing the concentration of volatile substance in one portion of said body and increasing the concentration in another portion of said body while still leaving in such latter portion a substantial proportion of absorption liquid, evaporating the volatile substance from the undiluted concentrated portion of the solution to produce refrigeration and again increasing the concentration of volatile substance in the solution from which the volatile substance has been so evaporated.

ABRAHAM KATZOW.